UNITED STATES PATENT OFFICE.

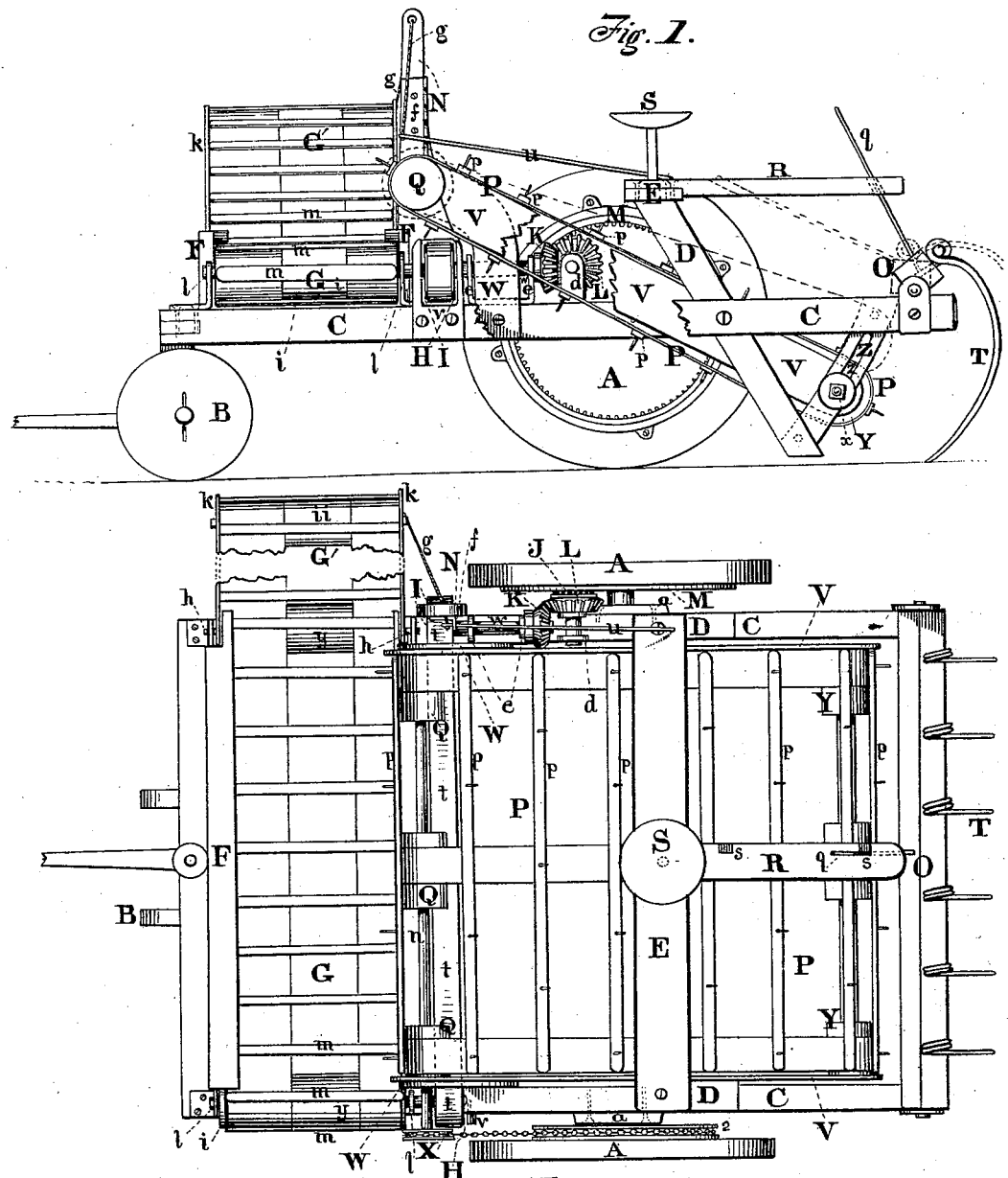

FRANK MARION, OF TREMONT, ILLINOIS.

IMPROVEMENT IN HAY-LOADERS.

Specification forming part of Letters Patent No. 160,023, dated February 23, 1875; application filed August 24, 1874.

*To all whom it may concern:*

Be it known that I, FRANK MARION, of Tremont, in the county of Tazewell and in the State of Illinois, have invented an Improvement in Machines for Raking and Gathering Hay, and loading the same upon an accompanying wagon; and do hereby declare that the following is a full, clear, and exact description thereof, reference being had to the annexed drawings making a part of this specification, in which like letters of reference refer to like parts, and in which—

Figure 1 represents a sectional elevation of the machine, part of the frame being broken away at the center to show inclined or rear draper P P P, &c., more clearly, and part of the side pieces V V of the draper P P P also broken away to exhibit the gearing which operates the draper and elevator G G'; Fig. 2, a plan view of the same.

This machine consists of a square horizontal frame, supported upon wheels in the rear of the center of the same, and by a swinging or pivoted axle and wheels in front. Curved raking-rods, set in a horizontal bar moved by a lever, extend across the rear of the machine behind the wheels, and from the hollow of the rake, and from near the ground, runs upon a roller an inclined draper, which carries the hay up from the rake, its upper end being supported upon a roller above the horizontal draper and elevator, which lies across the front of the machine, and which carries the hay to an accompanying wagon. The rollers which carry the latter draper are situate one at each end of the horizontal portion of the draper, each having a driving-pulley thereto attached and moved by the same band. One of said pulleys is driven by a bevel-pinion on the other end of its axle, which engages with a second pinion, which is attached to a spur-pinion engaged with an internal gear-wheel on the inner face of one of the supporting-wheels. The lower end of the draper, which first elevates the hay from the rake, is capable of being raised or lowered, according to the accumulation of the hay within the rake, by adjustable nut and screw, or an equivalent, on the end of the roller-spindle, moving within a curved slot in a segmental brace. This draper is driven by a chain or band from a pulley on the supporting-wheel opposite to that one which drives the other draper or loader. I also provide the lower draper of some of my machines, here described, with belts capable of being lengthened by buckles or other adjustable fastenings, (said belts carrying the usual slats and teeth,) for the purpose of extending the draper farther to the rear, with the carrying-rollers and supporting-braces, to reach the hay within the rake when the same is thin or short, and to be shortened back when the hay is plentiful, so that the draper and rollers cannot press the gathered mass against the rake and strain the teeth.

The following is a description of one of the forms in which I construct this machine:

A A in the accompanying drawings are the supporting-wheels, which are mounted on short axles, bolted through flanges or arms $a\ a$ to the frame. On the inner face of one is a band-pulley, 2, from whence a chain or band runs to a pulley, X, on the end of the spindle of the roller or rollers Q, which operate the elevator P P, which runs down to the rake O T. The other wheel A carries an internal gear-wheel, M, on its inner side, which engages with a pinion, J, attached to a bevel or miter wheel, L, which, in turn, engages with a second bevel or miter wheel, K, on the end of the axle W of the pulley I, which carries one end of the band $t\ t$, the other end of same passing around the pulley H on the end of the outer draper-roller $y$ of the draper and elevator G G', which extend across the front of the frame C C. The whole of the gearing just described is erected upon the frame C C. B B represent the fore wheels of the machine, and are arranged to pass under the frame so as to turn the machine on a short space of ground. The elevator G is retained at any height for effective discharge of the hay into an accompanying wagon, in the usual mode, by a rope, $g$, and standard N. Said rope, attached to the free end of a rod, $u$, which at the other end is attached to the brace E, is retained in any of the notches in a rack, $f$, attached to said standard N. The pivots of the rollers $y\ y$ of the draper G are in journals $l\ h$ erected on either side piece of the frame C C, and the draper is confined within the usual siding F F. The draper P P P, which runs from the rake O T, is supported by rollers Y Y at some distance behind the supporting-wheels A A pivoted at each side of the frame in a curved slot, z, in a segmental brace, Z, attached above to the frame C, and below to a diagonal brace, D, attached to the frame and supporting the cross-piece E and seat S. The spindles of said rollers Y are raised or lowered by adjusting a nut and screw, x, at the end of each spindle. A curved support, W, one on either side of the frame, just behind the front draper G, acts as the pivots and supports of the rollers Q Q, which carry the upper end of the draper P P, &c., and hold it over the edge of the draper or loader G, that the latter may receive the hay brought up by the former from the rake. The slats of this draper are armed with teeth for catching up the hay from the rake, and on each side are the usual side pieces V V, through each end of which the spindle of the roller passes, the upper spindle ending in a pulley, X, in a line with the chain or band pulley 2 of the supporting-wheel on this side of the machine. O represents a bar which is studded with the raking-teeth T. It lies across the rear of the frame C C at a good operating distance behind the wheels A A, and is pivoted at each end upon said frame, and provided with a lever, q, to advance or throw back the teeth, which lever is retained by either of the notches s s in the horizontal bar R above, so as to be managed from the driver's seat S. The teeth T are curved in the usual mode, and may be made with one or more coils or bends at their base to render them more elastic.

The operation of this machine as follows:

When not in use, the teeth T of the rake O T are elevated by depressing the lever q which is set in the bar O, and then detained in a notch, s s, in the bar R. The draper P P is raised or lowered adjustably at the lower end in the slot z of the segmental bar or guide Z, according to the quantity of hay in the rake. The hay is delivered by the draper P P onto the horizontal carrier or draper G, and by the elevator or loader G′ is thrown into an accompanying wagon traveling with the machine. The draper P P is driven by a pulley, X, and chain or band running over a band-wheel, 2, on inside of the supporting-wheel on one side of the machine, while the other supporting-wheel drives the band t of the carrying and loading draper G G′, by means of pulley I, pinions K and L, and attached pinion J, which gears with the internal gear-wheel M on the inside of the latter supporting-wheel A.

What I claim as my invention is—

The construction and arrangement of the frame C C, draper and adjustable elevator or loader G G, draper-supports W W, spindle n, rollers Q Q, side pieces V V, draper P P P, rollers y y, adjustable nut x for raising or lowering the draper at this end within the segmental guides Z Z, guides z z, bars D D, and rake O T, as described.

In testimony that I claim the foregoing hay raker and loader I have hereunto set my hand this 27th day of April, 1874.

FRANK MARION.

Witnesses:
JAMES THURLOW,
H. W. WELLS.